United States Patent [19]

Sekimoto et al.

[11] Patent Number: 4,483,055
[45] Date of Patent: Nov. 20, 1984

[54] SECONDARY WORKING APPARATUS

[75] Inventors: Hironobu Sekimoto; Norio Sato, both of Fuji, Japan

[73] Assignee: Nissan Motor Company, Limited, Yokohama, Japan

[21] Appl. No.: 388,134

[22] Filed: Jun. 14, 1982

[30] Foreign Application Priority Data

Aug. 27, 1981 [JP] Japan .................. 56-134708

[51] Int. Cl.³ .............. B23P 15/14; B23F 19/06
[52] U.S. Cl. ................... 29/159.2; 72/100; 72/108; 72/123; 409/8; 409/49
[58] Field of Search ............ 409/22, 23, 24, 37, 409/49, 55, 262, 268, 247, 59, 60, 143, 8, 9, 62; 72/120, 123, 117, 125, 126, 102, 104, 108, 91, 122; 29/566, 159.2

[56] References Cited

U.S. PATENT DOCUMENTS 1,740,792 12/1929 Strachauer et al. ............... 72/117
3,735,618 5/1973 Zook .................................. 72/91
3,803,896 4/1974 Cermak et al. ............... 29/159.2

FOREIGN PATENT DOCUMENTS 55-108992 10/1980 Japan .
519259 6/1979 U.S.S.R. ...................... 72/123

Primary Examiner—William R. Briggs
Attorney, Agent, or Firm—Lane, Aitken and Kananen

[57] ABSTRACT

A secondary working apparatus for secondarily machining a blank formed with internal serrations on a cylindrical plane, comprising a stationary housing structure, support means for supporting the blank with the center axis of the cylindrical plane fixed with respect to the housing structure, a plurality of shafts each having a center axis parallel with the center axis of the cylindrical plane and rotatable with respect to the housing structure about an axis coincident with the center axis of the shaft and an axis coincident with the center axis of the cylindrical plane, each of the shafts having a cylindrical eccentric axial portion having a center axis parallel with and radially offset from the center axis of the shaft, cylindrical machining tools coaxially carried on the eccentric axial portions of the shafts, respectively, and each having a center axis coincident with the center axis of the eccentric axial portion of each of the shafts, and an annular guide gear coaxially held in position about the center axis of the cylindrical plane and formed with internal teeth to be held in mesh with the internal serrations of the blank, the internal teeth being equal in number to the internal serrations of the blank and being cut with outwardly shifted tooth profiles, the guide gear being preferably constructed of highly elastic metal, such as spring steel.

12 Claims, 11 Drawing Figures

SECONDARY WORKING APPARATUS

FIELD OF THE INVENTION

The present invention relates to a secondary working apparatus for the secondary machining of a blank preliminarily formed with serrations, splines or teeth.

SUMMARY OF THE INVENTION

In accordance with the present invention, there is provided a secondary working apparatus for secondarily machining a blank preliminarily formed with internal serrations, splines or teeth on a cylindrical plane having a center axis therethrough. The internal serrations, splines or teeth as above mentioned of the blank to be machined by the secondary working apparatus proposed by the present invention will be hereinafter referred to as and represented by serrations. The secondary working apparatus according to the present invention comprises a stationary housing structure; support means for supporting the blank with the center axis of the cylindrical plane fixed with respect to the housing structure; a plurality of shafts each having a center axis substantially parallel with the center axis of the above mentioned cylindrical plane and rotatable with respect to the housing structure about an axis substantially coincident with the center axis of the shaft and an axis substantially coincident with the center axis of the aforesaid cylindrical plane, each of the shafts having a cylindrical eccentric axial portion having a center axis substantially parallel with and radially offset from the center axis of the shaft; generally cylindrical machining tools coaxially carried on the eccentric axial portions of the shafts, respectively, and each having a center axis substantially coincident with the center axis of the eccentric axial portion of each of the shafts; and an annular guide gear coaxially held in position about the center axis of aforesaid cylindrical plane and formed with internal teeth to be held in mesh with the internal serrations of the blank, the internal teeth being equal in number to the internal serrations of the blank and being cut with outwardly shifted tooth profiles, the guide gear being preferably constructed of highly elastic metal, such as spring steel. In the apparatus thus constructed and arranged, the machining tools may include at least one coining tool and/or at least one finishing tool each formed with external serrations to be held in mesh with the internal serrations of the blank. In this instance, the shafts respectively having the coining and/or finishing tools carried thereon are preferably arranged to have their respective center axes diametrically opposite to each other across the center axis of the aforesaid cylindrical plane. If desired, the above mentioned machining tools of a secondary working apparatus according to the present invention may further include at least one coining tool formed with external serrations to be in mesh with the internal serrations of the blank. In this instance, the above mentioned shafts are preferably arranged to have their respective center axes substantially in symmetry with respect to the center axis of the cylindrical plane.

The secondary working apparatus thus constructed and arranged basically in accordance with the present invention may further comprise a planetary gear assembly which comprises an internally toothed ring gear rotatable with respect to the housing structure about an axis substantially aligned with the center axis of the aforesaid cylindrical plane, an externally toothed sun gear coaxially encircled by the ring gear, a plurality of planet pinions each held in mesh with the ring gear and the sun gear and rotatable with each of the above mentioned shafts about the center axis of the shaft, and a pinion carrier carrying the planet pinions and the shafts, one of the sun gear and the pinion carrier being rotatable about the axis of rotation of the ring gear. In this instance, the above mentioned support means may be constructed and arranged to be operative to have the blank fixedly held in position with respect to the housing structure, wherein the sun gear is rotatable with respect to the housing structure about the axis of rotation of the ring gear and the pinion carrier is rotatable with the ring gear about the axis of rotation of the ring gear so that the shaft and accordingly the machining tool carried on the shaft are rotatable with respect to the pinion carrier about the center axis of the shaft and with respect to the housing structure about the common axis of rotation of the ring gear and the sun gear.

The secondary working apparatus according to the present invention may further comprise differential-speed drive means operative to drive the ring gear and sun gear of the planetary gear assembly for rotation with respect to the housing structure about the common axis of rotation thereof at speeds with a predetermined difference established therebetween. Such differential-speed drive means may comprise an externally toothed first driven gear rotatable about an axis aligned with the common axis of rotation of the ring gear and the sun gear of the planetary gear assembly, an externally toothed second driven gear axially spaced apart from the first driven gear and rotatable about an axis substantially aligned with the axis of rotation of the first driven gear, and an internally toothed drive gear coaxially encircling and held in mesh with both of the first driven gear and the second driven gear, the external teeth of each of the first and second driven gears being equal in diametral pitch to the internal teeth of the drive gear and being different in number from the external teeth of the other of the first and second driven gears.

BRIEF DESCRIPTION OF THE DRAWINGS

Drawbacks of a prior-art secondary working apparatus of the nature to which the present invention generally appertains and further details of a secondary working apparatus according to the present invention will be understood from the following description taken in conjunction with the accompanying drawings in which.

DESCRIPTION OF THE PRIOR ART

Figure 1:
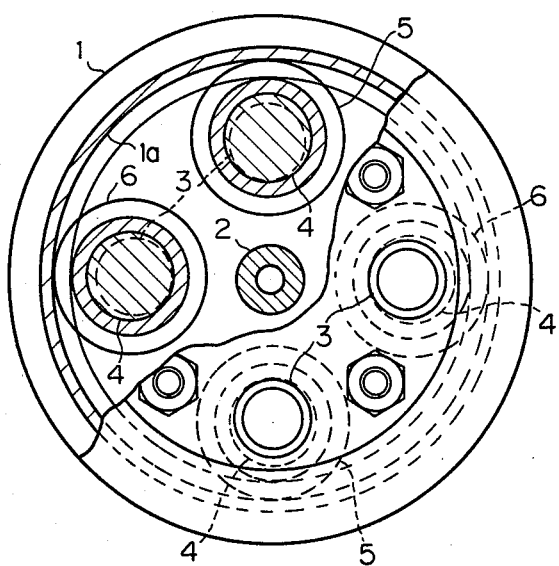
FIG. 1 is an end view showing, partially in cross section, of a known secondary working apparatus of the nature to which the present invention appertains.

In FIG. 1 of the drawings is shown in cross section an example of a known secondary working apparatus. The prior-art apparatus is disclosed in Japanese patent application No. 55-108,992 and is used for the secondary machining of a ring-shaped blank 1 of metal. The secondary working apparatus includes a planetary gear assembly (not shown) mounted on a drive shaft 2 and having sun and ring gears rotatable about the center axis of of the shaft 2 and planet pinions intervening between the sun and ring gears. The planet pinions are rotatable with pinion shafts 3, respectively, connected together by a pinion carrier (not shown) and each having an axis of rotation parallel with the center axis of the drive shaft 2. The drive shaft 2 and the ring gear of the planetary gear assembly are connected to suitable drive means to drive the sun and ring gears for rotation at different speeds about the center axis of the shaft 2. Each of the pinion shafts 3 has a cylindrical, eccentric axial portion 4 having a center axis offset from the axis of rotation of the pinion shaft 3. One pair of pinion shafts 3 have carried thereon spool-shaped coining tools 5 slidable on the eccentric axial portions 4 of the pinion shafts 3, respectively, and the other pair of pinion shafts 3 have carried thereon cylindrical finishing tools 6 slidable on the eccentric axial portions 4 of the pinion shafts 3, respectively. Each of the coining tools 5 has a pair of externally serrated axial land portions axially spaced apart from each other to form a circumferential groove therebetween. On the other hand, each of the finishing tools 6 is externally serrated axially of the finishing tool 6 throughout the length of the tool 6. Each of the coining and finishing tools 5 and 6 is rotatable with the axial portion 4 about the axis of rotation of the pinion shaft 3 with respect to the pinion carrier.

Figure 2:
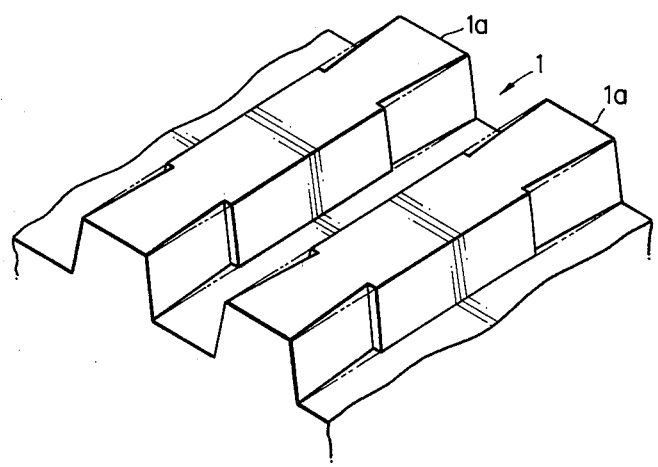
FIG. 2 is a fragmentary perspective view showing, to an enlarged scale, a portion of an article into which a blank machined in the apparatus shown in FIG. 1 is to be shaped.

The ring-shaped blank 1 to be secondarily worked by the prior-art secondary working apparatus thus constructed is preliminarily worked roughly in the form of, for example, an internally serrated synchronizer clutch sleeve for use in a synchromesh power transmission mechanism for an automotive vehicle. The blank 1 is thus formed with internal serrations 1a which axially extend in parallel with the center axis of the blank 1 and are to be ultimately worked into spline teeth having counter-wedged opposite end portions each having a pair of counter-wedged side faces as indicated in FIG. 2 of the drawings. The axial groove between every adjacent two serrations of each coining tool 5 is thus reduced in counter-wedged form toward the outer axial ends of each land portion so that each of the serrations has opposite end portions enlarged toward the outer axial ends of each land portion.

For the working of the blank 1 in the prior-art secondary working apparatus of the above described nature, the blank 1 is fitted to the coining and finishing tools 5 and 6 and is fixedly held in position with respect to the housing structure with use of a suitable clamping device (not shown). The sun and ring gears of the planetary assembly on the drive shaft 1 are then driven for rotation in the same directions about the center axis of the shaft 1 at speeds with a predetermined difference. As a result of such a differential rotary motion between the sun and ring gears, the pinion carrier and accordingly the pinion shafts 3 are caused to turn about the center axis of the drive shaft 2 with respect to the sun gear. Each of the planet pinions and accordingly each of the the pinion shafts 3 are therefore caused to turn with respect to the sun gear about the center axis of the shaft 2 and further with respect to the pinion carrier about the center axis of each planet pinion due to the eccentricity of the coining tool 5 with respect to the pinion shaft 3. It therefore follows that the coining and finishing tools 5 and 6 are caused to turn about the respective center axes of the pinion shafts 3 while turning about the common axis of rotation of the pinion shafts 3. The coining and finishing tools 5 and 6 are thus caused to roll on the blank 1 so that the serrations of the tools 5 and 6 are forced deeper into the spaces between the internal serrations 1a of the blank 1 and are caused to slide on the opposite side faces of the serrations 1a of the blank 1. Each of the serrations 1a of the blank 1 is these manners shaped and sized conformingly to the space between every two serrations of the coining tools 5 and is cleared of the flashes produced.

The prior-art secondary working apparatus constructed and arranged as above described is adapted to provide enhanced accuracy of machining of internally serrated blanks since the internal serrations of each blank are uniformly pressed upon by the external serrations of the tools. Because, furthermore, of the fact that the internal serrations of the blank are progressively worked by repeated applications of pressing forces thereto, the blank being worked is not subjected to undue stresses and strains and is cleared of flashes and burrs without having recourse to additional deburring steps.

Figure 3:
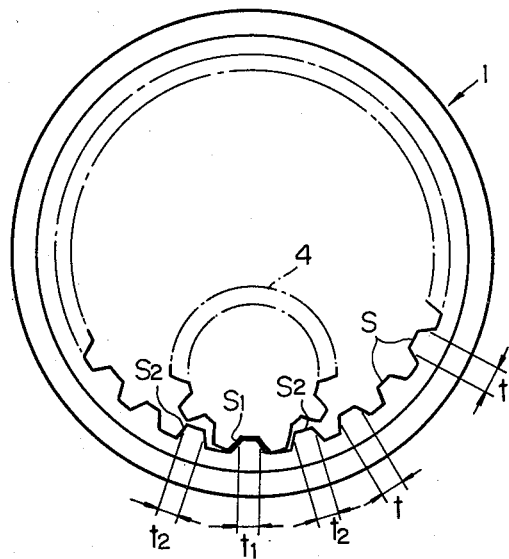
FIGS. 3 and 4 are schematic plan views each showing the arrangement in which one of coining tools forming part of the prior-art secondary working apparatus shown in FIG. 1 is held in mesh with a blank.

As is well known in the art, a synchronizer clutch sleeve for use in a synchromesh power transmission mechanism for an automotive vehicle forms part of a synchronizer clutch assembly provided between any two shift gears carried typically on the output shaft of the power transmission mechanism and is adapted to provide coupling selectively between one of the shift gears and the transmission output shaft depending upon the axial position of the clutch sleeve with respect to the output shaft. Though not shown in the drawings, the clutch sleeve is axially slidable on a clutch hub splined to the transmission input shaft and is axially engageable with one of two synchronizing or baulk rings respectively rotatable with the shift gears. The clutch hub is formed with three axial grooves and has three insert keys respectively fitted in these grooves. The insert keys are pressed by circlip springs outwardly into three axial grooves each formed in the middles of the internal serrations of the clutch sleeve. Each of the three axial grooves thus provided in the clutch sleeve is formed by removing a side portion of each of the two internal serrations on both sides of each groove in such a manner as to enlarge the serration intervening between the two serrations. As a consequence, the coupling sleeve as a whole has for each of the three axial grooves such serration that has thicknesses less than the other serration of the sleeve. In FIG. 3 of the drawings, the internally serrated coupling sleeve 1 of this nature is shown having internal serrations including serrations S having normal thicknesses t and serrations $S_1$ and $S_2$ having reduced thicknesses $t_1$ and $t_2$, respectively. Here, it is assumed that the thickness $t_1$ of the serration $S_1$ intervening between the serrations $S_2$ is less than the thickness $t_2$ of each of the serrations $S_2$.

Figure 4:
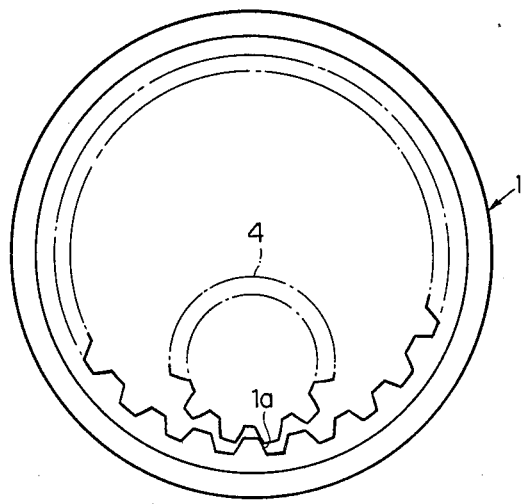

When the ring-shaped blank 1 formed with such serrations S, $S_1$ and $S_2$ is to be machined in the prior-art secondary working apparatus of the described nature, the external serrations or spline teeth of each of the coining tools 5 may fail to contact the serrations $S_1$ and $S_2$ with the reduced thicknesses $t_1$ and $t_2$. As the coining tool 5 is displaced closer to the serrated perimeter of the blank 1 due to the eccentricity between the center axis of the coining tool 5 and the center axis of the shaft 3, the serrations or spline teeth of the coining tool 5 thus fail to maintain proper mating engagement with these serrations $S_1$ and $S_2$ of the blank 1 and would ride on the serrations $S_1$ and $S_2$ as indicated in FIG. 4 of the drawings in the worst case. The present invention contemplates elimination of such a problem encountered in secondarily working a blank having irregularly thick internal splines.

DESCRIPTION OF THE PREFERRED EMBODIMENT

Figure 5:
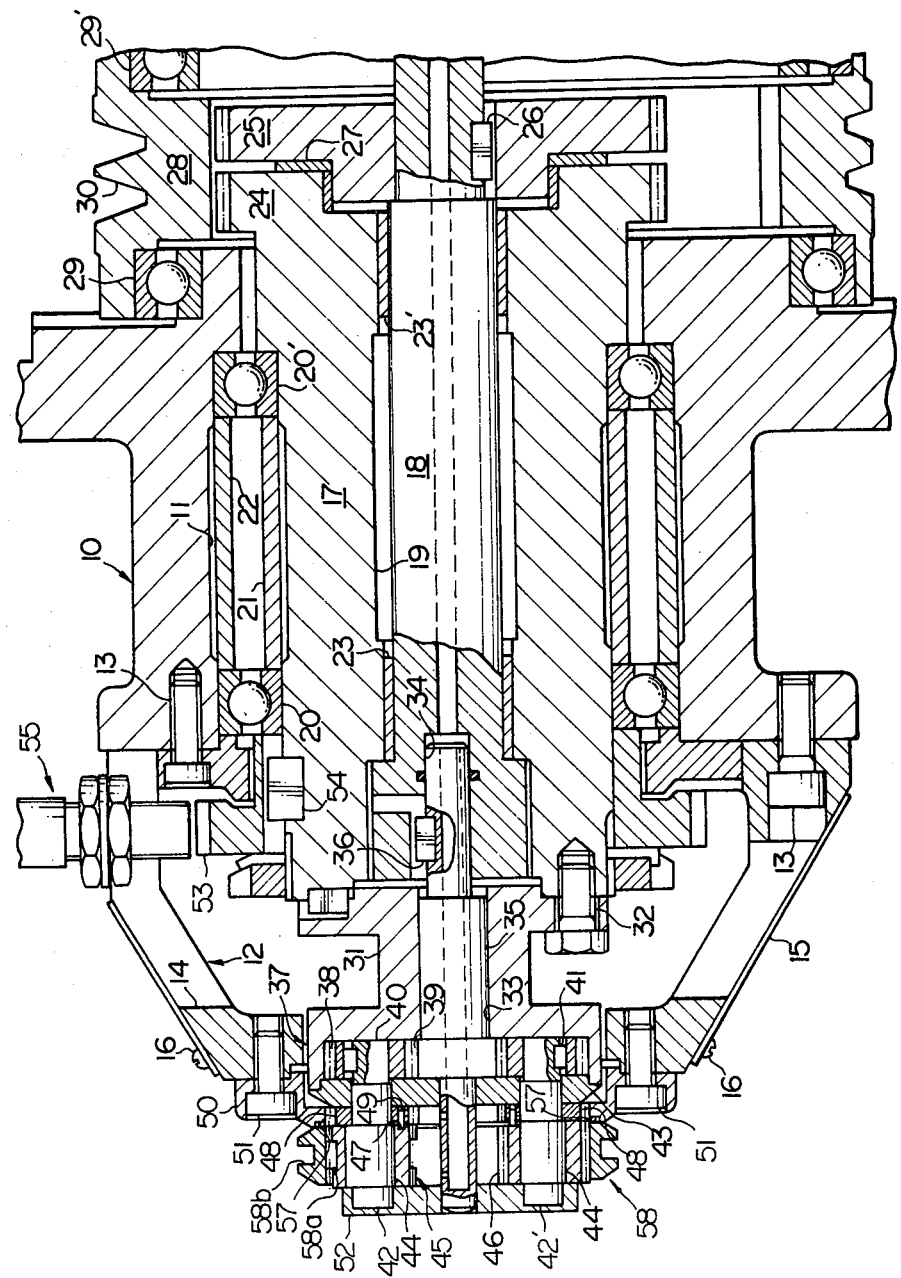
FIG. 5 is a longitudinal sectional view of a preferred embodiment of a secondary working apparatus according to the present invention.

Referring to FIG. 5 of the drawings, a secondary working apparatus embodying the present invention comprises a stationary housing structure including a housing shell 10 formed with a generally cylindrical axial bore 11 which is open at opposite ends thereof. The housing structure further includes a generally frusto-conical, hollow support member 12 which is securely connected to the housing shell 10 by suitable fastening means such as bolts 13 as shown and which is formed with an opening 14. To a reduced outer axial end portion of the support member 12 is fixedly attached a generally frusto-conical dust cover 15 also by suitable fastening means such as screws 16 as shown.

The secondary working apparatus embodying the present invention further comprises differential-speed drive means adapted to produce a predetermined differential speed of rotation from a driving power with a given revolution speed. In the secondary working apparatus herein shown, such differential-speed drive means comprises a hollow shaft 17 and a center shaft 18. The hollow shaft 17 axially extends through the bore 11 and is formed with an axial bore 19 coaxial with the bore 11. The center shaft 18 axially extends through the bore 19 in the hollow shaft 17 and has a center axis coincident with the center axis of the hollow shaft 17 and accordingly with the center axis of the axial bore 11. The hollow shaft 17 has axial portions journaled in bearings 20 and 20' respectively received in internal wall portions of the housing shell 10 and is rotatable about the center axis of the center shaft 18 with respect to the housing shell 10. The bearings 20 and 20' are axially held in position on the hollow shaft 17 by means of cylindrical inner and outer spacer sleeves 21 and 22 axially intervening between the bearings 20 and 20' and coaxially surrounding an intermediate axial portion of the hollow shaft 17 as shown. The hollow shaft 17 is, furthermore, rotatably mounted on the center shaft 18 by means of a pair of cylindrical bushes 23 and 23' so that the hollow shaft 17 and the center shaft 18 are rotatable about the common center axis thereof with respect to each other and to the housing shell 10. The hollow shaft 17 axially extends beyond the inner axial end of the housing shell 10 and is connected to or has carried on an outer axial portion thereof an externally toothed first driven gear 24 having a center axis aligned with the common center axis of the hollow shaft 17 and the center shaft 18. The first driven gear 24 is herein shown as forming part of and accordingly being integral with the hollow shaft 17 but, if desired, may be constructed independently of the hollow shaft 17 and securely connected to the hollow shaft 17 in a suitable manner or by suitable fastening means. The first driven gear 24 is thus rotatable with the hollow shaft 17 about the common axis of the hollow shaft 17 and center shaft 18 and is assumed to have a $n_1$ number of gear teeth. On the other hand, the center shaft 18 has an axial extension projecting inwardly from the inner axial end of the bore 19 in the hollow shaft 17. The axial extension of the center shaft 18 is connected to or has carried thereon an externally toothed second driven gear 25 having a center axis aligned with an extension of the common center axis of the hollow shaft 17 and center shaft 18. The second driven gear 25 is herein shown as being constructed independently of the center shaft 18 and keyed as at 26 to the axial extension of the center shaft 18 but, if desired, may be splined to the axial extension of the center shaft 18 or may be integral with the center shaft 18. The second driven gear 25 is thus rotatable about the extension of the common center axis of the hollow shaft 17 and the center shaft 18 and is assumed to have a $n_2$ number of gear teeth. Between the first and second driven gears 24 and 25 is interposed a collar bearing 27 holding the center shaft 18 in axial position with respect to the hollow shaft 17.

The differential-speed drive means of the secondary working apparatus embodying the present invention further comprises an internally toothed drive gear 28 having a pair of axially opposite flange portions respectively received on bearings 29 and 29' which are axially held in position on an inner axial end portion of the housing shell 10. The drive gear 28 is provided in a coaxially encircling relationship to the above mentioned first and second driven gears 24 and 25 and is internally held in mesh with both of the gears 24 and 25. The external teeth of each of the first and second driven gears 24 and 25 are equal in diametral pitch (or "module" for metric gears) to the internal teeth of the drive gear 28 and, furthermore, the number $n_1$ of the teeth of the first driven gear 24 is different from, viz., smaller or larger by a predetermined integer than the number $n_2$ of the teeth of the second driven gear 25. In order that such gears 24 and 25 are permitted to be commonly in mesh with the drive gear 28 and to be nevertheless rotatable about a common axis coincident with the axis of rotation of the drive gear 28, one of the first and second driven gears 24 and 25 having the greater number of teeth is produced by cutting the teeth thereof with negatively or inwardly shifted tooth profiles providing reduced outside diameters or addenda and/or the other of the first and second driven gears 24 and 25 having the smaller number of teeth is produced by cutting the teeth thereof with positively or outwardly shifted tooth profiles providing increased outside diameters or addenda. If, thus, the respective numbers of the teeth of the first and second gears 24 and 25 are selected so that the number $n_2$ of the teeth of the second driven gear 25 is larger than the number $n_1$ of the teeth of the first driven gear 24, then the first driven gear 24 is produced by cutting the teeth thereof with positively or outwardly shifted tooth profiles providing increased outside diameters or addenda and/or the second driven gear 25 is produced by cutting the teeth thereof with negatively or inwardly shifted tooth profiles providing reduced outside diameters or addenda. For purposes of description, it is herein assumed that the number $n_1$ of the teeth of the first driven gear 24 is smaller than the number $n_2$ of the teeth of the second driven gear 25 and that the second driven gear 25 in particular is produced by cutting the teeth thereof with negatively or inwardly shifted tooth profiles.

The first and second driven gears 24 and 25 and the drive gear 28 constitute in combination a gear train which is known as the Furgusson's mechanical paradox or "strange" gear train. When the drive gear 28 of such a gear train is driven for rotation at a certain speed about the center axis thereof, the two driven gears 24 and 25 are caused to rotate about the common center axis thereof at speeds which differ from each other by a value proportional to the difference between the respective numbers of teeth of the gears 24 and 25. If, thus, it is assumed by way of example that the number $n_1$ of the first driven gear 24 is 120 while the number $n_2$ of the second driven gear 25 is 121, the relative motion produced between the two gears 24 and 25 is such that the first driven gear 24 is caused to turn faster than the second driven gear 25 through an angle corresponding to one pitch, viz., the angle of rotation of 3 degrees corresponding to the 1/120 fraction of a full turn of the gear 24 each time the second driven gear 25 makes a full turn. The drive gear 28 forming part of such a gear train is operatively connected to a suitable driving source such as a reversible motor (not shown). For this purpose, the drive gear 28 has a grooved pulley 30 formed by an outer peripheral portion of the gear 28. The pulley 30 constitutes a driven pulley forming part of a belt and pulley mechanism which further comprises a driving pulley coupled to the driving source and an endless belt passed between the driving and driven pulleys, though not shown in the drawings. The driving source for such a belt and pulley mechanism is provided with suitable control means adapted to start and stop the driving source and to actuate the driving source for rotation in opposite directions in response to control signals supplied thereto during each cycle of operation of the secondary working apparatus.

The hollow shaft 17 axially extends slightly beyond the outer axial end of the housing shell 10 and is securely connected to a gear casing 31 by suitable fastening means such as bolts, one of which is indicated at 32. The gear casing 31 axially extends within the hollow support member 12 and is formed with an axial bore 33 having a center axis aligned with the center axis of the second driven gear 25. On the other hand, the center shaft 18 has formed in its outer end portion an axial bore 34 into which a gear shaft 35 axially extends. The gear shaft 35 is keyed as at 36 to or otherwise rotatable with the center shaft 18 and axially extends beyond the gear casing 31 through the bore 33 in the gear casing 31. The gear casing 31 and the gear shaft 35 are rotatable with the hollow shaft 17 and center shaft 18, respectively, about an extension of the common center axis of the shafts 17 and 18 and form part of a planetary gear assembly 37 to be driven by the shafts 17 and 18. For this purpose, the gear casing 31 has an internally toothed flange portion constituting a ring gear 38, while the gear shaft 35 has an externally toothed intermediate axial portion constituting a sun gear 39 coaxially encircled by the ring gear 38. The ring gear 38 and the sun gear 39 have a common axis of rotation aligned with the common center axis of the first and second driven gears 24 and 25. The planetary gear assembly 37 further comprises four externally toothed planet pinions 40 which are arranged symmetrically about the common axis of rotation of the ring and sun gears 38 and 39. Each of the planet pinions 40 intervenes between the ring and sun gears 38 and 39 and is held in mesh with the ring gear 38 and with the sun gear 39. The planet pinions 40 are keyed as at 41 to or otherwise coaxially rotatable with two pairs of pinion shafts 42 and 42', respectively, each of which has a circular cross section and an axis of rotation parallel with the common axis of rotation of the ring and sun gears 38 and 39 as will be better seen from FIGS. 6 and 7. The individual pinion shafts 42 and 42' are connected together by means of a pinion carrier 43 formed with openings through which the pinion shafts 42 and 42' axially extend outwardly, viz., in directions opposite to the gear casing 31. The pinion carrier 43 is securely coupled to the flange portion of the gear casing 31 and accordingly to the ring gear 38 by suitable fastening means. The pinion shafts 42 and 42' and the planet pinions 40 are thus not only individually rotatable about the respective axes of rotation of the pinion shafts 42 and 42' with respect to the pinion carrier 43 but also together with the ring gear 38 about the common axis of rotation of the ring and sun gears 38 and 39 with respect to the sun gear 39 and the support member 12 forming part of the housing structure. The ring gear 38, sun gear 39 and planet pinions 40 are axially held in position between the pinion carrier 43 and an annular disc portion of the gear casing 31. The gear shaft 35 has an axial extension projecting outwardly through a central opening formed in the pinion carrier 43.

Figure 6:
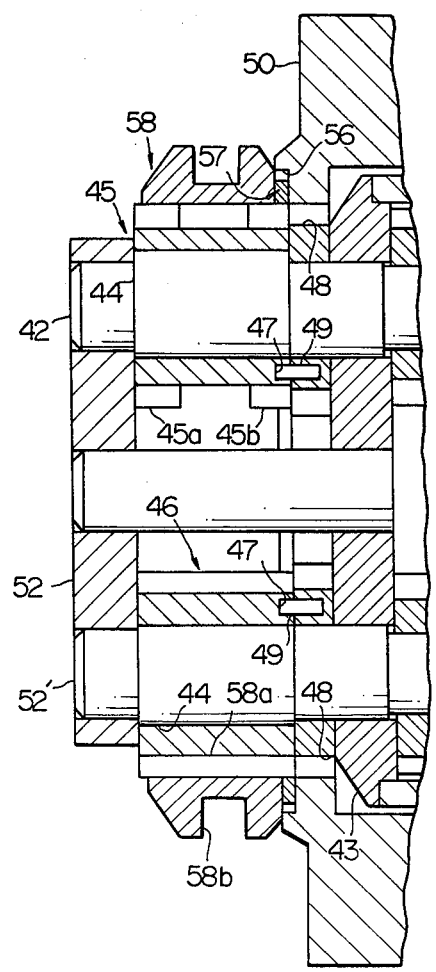
FIG. 6 is a sectional view showing, to an enlarged scale, portions of the embodiment illustrated in FIG. 5.
Figure 7:
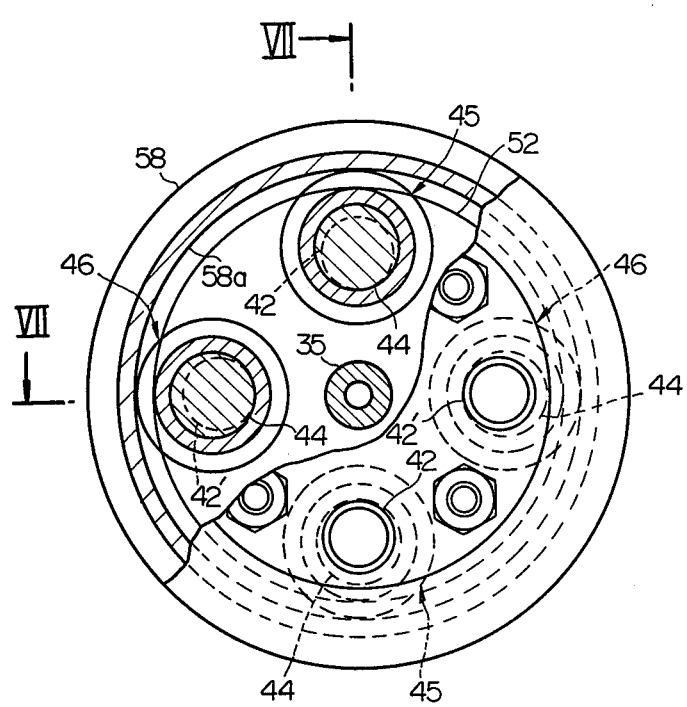
FIG. 7 is a schematic end view of the secondary working apparatus illustrated in FIGS. 5 and 6 each of which is taken on planes indicated by lines VII—VII in FIG. 7.
Figure 8:
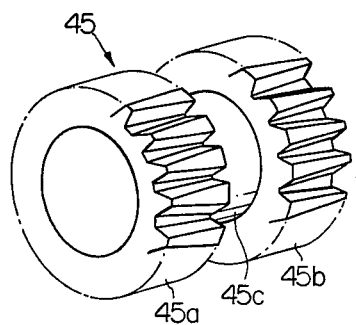
FIG. 8 is a perspective view showing a coining tool included in the secondary working apparatus illustrated in FIGS. 5 to 7.
Figure 9:
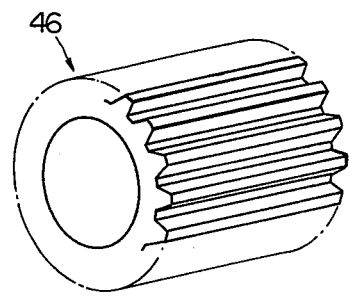
FIG. 9 is a perspective view showing a finishing tool also included in the secondary working apparatus shown in FIGS. 5 to 7.

Each of the pinion shafts 42 and 42' axially projects outwardly from the openings in the pinion carrier 43 and has a cylindrical, eccentric axial portion 44 having a circular cross section and a center axis offset from the axis of rotation of the pinion shaft as will be best seen from FIG. 6. As shown in FIG. 7, furthermore, the pinion shafts 42 and 42' are arranged symmetrically with respect to an extension of the common axis of rotation of the ring and sun gears 38 and 39 and, thus, consist of a first pair of pinion shafts 42 diametrically opposite to each other across the extension of the axis and a second pair of pinion shafts 42' diametrically opposite to each other across the extension of the axis and located at right angles to the first pair of pinion shafts 42. Each of the first pair of diametrically opposite pinion shafts 42 has carried thereon a generally spool-shaped coining tool 45 having a smooth inner peripheral surface slidably received on the outer peripheral surfaces of the eccentric axial portion 44 of each of the pinion shafts 42. On the other hand, each of the second pair of diametrically opposite pinion shafts 42' has carried thereon a generally cylindrical finishing tool 46 having a smooth inner peripheral surface slidably received on the outer peripheral surface of the eccentric axial portion 44 of each of the pinion shafts 42'. Each of the coining tools 45 is similar to each of the coining tools 5 of the prior-art secondary working apparatus shown in FIG. 1 and, thus, has a pair of generally cylindrical, externally serrated axial land portions 45a and 45b which are axially spaced apart from each other to form a circumferential groove 45c therebetween as illustrated in FIG. 8. The external serrations of each of the land portions 45a and 45b axially extend throughout the length of the land portion and are axially aligned with the external serrations of the other land portion. On the other hand, each of the finishing tools 46 is similar to each of the finishing tools 6 of the prior-art secondary working apparatus as shown in FIG. 1 and is, thus, externally serrated throughout the length of the tool as illustrated in FIG. 9. Each of the coining and finishing tools 45 and 46 is slidable on the outer peripheral surface of the eccentric axial portion 44 of each of the pinion shafts 42 and 42' about the center axis of the eccentric axial portion 4 and is rotatable with the axial portion 44 about the axis of rotation of each of the pinion shafts 42 and 42' with respect to the pinion carrier 43. As will be best seen from FIG. 6, each of the coining and finishing tools 45 and 46 is formed with a radial slot 47 extending in a radial direction of the tool and axially open toward the pinion carrier 43.

Each of the pinion shafts 42 and 42' has two concentric axial portions extending in opposite directions from the eccentric axial portion 44 thereof and having respective center axes coincident with the axis of rotation of the pinion shaft 42 or 42'. One concentric axial portion of each pinion shaft 42 or 42' extends through each of the openings in the pinion carrier 43 into the planet pinion 40. Each of these concentric axial portions of the individual pinion shafts 42 and 42' has slidably mounted thereon a ring-shaped, externally serrated locating pinion 48 which is located axially between the pinion carrier 43 and the coining or finishing tool 45 or 46. The locating pinion 48 has a guide pin 49 projecting from one end face of the locating pinion 48 in a direction parallel with the axis of rotation of the pinion shaft 42 or 42' having the locating pinion 48 carried thereon. The guide pin 49 axially extends into the above mentioned radial slot 47 in the coining or finishing tool 45 or 46 on the pinion shaft 42 or 42' so that the coining or finishing tool 45 or 46 and the locating pinion 48 on each of the pinion shafts 42 and 42' are rotatable together on the particular pinion shaft 42 or 42'. With the guide pin 49, the external serrations of the locating pinion 48 are axially aligned with the external serrations, respectively, of the coining or finishing tool 45 or 46. As the coining or finishing tool 45 or 46 on each of the pinion shafts 42 and 42' is thus rotated on the outer peripheral surface of the eccentric axial portion 44 of the pinion shaft 42 or 42' about the center axis of the eccentric axial portion 44, the locating pinion 48 is caused to rotate on the outer peripheral surface of the concentrical axial portion of the pinion shaft 42 or 42' about the axis of rotation of the pinion shaft. As the locating pinion 48 is turned on the pinion shaft 42 or 42', the guide pin 49 is displaced outwardly or inwardly in the slot 47 in the coining or finishing tool 45 or 46 in a radial direction of the tool 45 or 46. The respective locating pinions 48 are externally held in mesh with an internally toothed stationary member 50 securely connected to the housing structure by suitable fastening means such as bolts 51 which are screwed to the support member 12 as shown in FIGS. 5 and 6. The other concentric axial portions of the pinion shafts 42 and 42' constitute journal portions received in a retaining end plate 52 which is securely connected to or integral with the pinion carrier 43 of the planetary gear assembly 37 and which is formed with openings respectively having the journal portions of the pinion shafts 42 and 42' rotatably received therein. The retaining end plate 52 is further formed with a central opening into which the axial extension of the gear shaft 35 is rotatably received.

Turning back to FIG. 5, the hollow shaft 17 has mounted thereon a spur gear 53 which is keyed as at 54 to the shaft 17 and which is accordingly rotatable with the hollow shaft 17 about the center axis of the shaft 17. The gear 53 forms part of rotation-angle detecting means adapted to detect the angle through which the hollow shaft 17 and accordingly the pinion carrier 43 and each of the coining and finishing tools 45 and 46 are caused to turn about the aligned center axes of the center shaft 18 and the gear shaft 35 with respect to the housing structure. Such rotation-angle detecting means thus further comprises a suitable pick-up unit 55 mounted on the housing shell 10 and located in conjunction with the arcuate path of the teeth of the gear 53. The pick-up unit 55 is responsive to the passage of the teeth of the gear 53 through a predetermined zone adjacent the pick-up unit 55 and is operative to produce signals indicative of the number of the gear teeth passed through such a zone after the hollow shaft 17 has been initiated into motion to drive the coining tools 45 and the finishing tools 46 for rotation about the center axis of the center shaft 18 during each cycle of operation of the secondary working apparatus.

In accordance with an outstanding aspect of the present invention, the internally toothed stationary member 50 of the secondary working apparatus has formed in its axial end wall adjacent the coining and finishing tools 45 and 46 a depression or concavity 56 having a circular cross section as will be best seen from FIG. 6. An internally toothed, annular guide gear 57 is slidably received in this concavity 56 of the toothed stationary member 50 and is held in mesh with the externally serrated coining and finishing tools 45 and 46. The guide gear 57 is preferably constructed of a highly an elastic metal such as spring steel.

Figure 10:
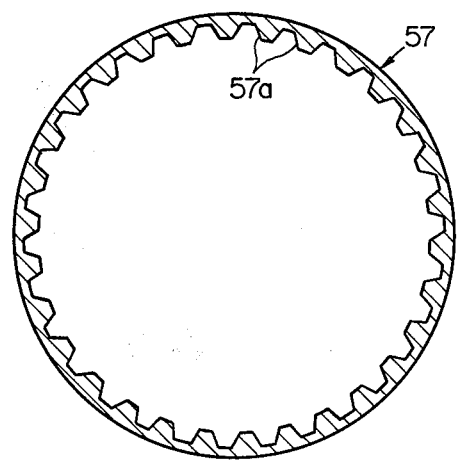
FIG. 10 is a cross sectional view of the guide gear included in the secondary working apparatus embodying the present invention.
Figure 11:
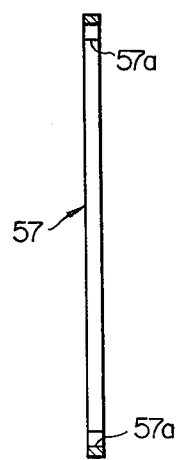
FIG. 11 is an axial sectional view of the guide gear shown in FIG. 10.

The secondary working apparatus embodying the present invention is assumed, by way of example, as being designed to be used for the secondary working of a generally ring-shaped, internally serrated blank 58 as shown in FIGS. 8 to 10. The blank 58 is similar to the previously mentioned blank 1 (FIGS. 1 to 4) and is preliminarily forged or otherwise roughly worked to ultimately form an internally splined synchronizer clutch sleeve for use in a manually-operated synchromesh power transmission mechanism for an automotive vehicle. Thus, the blank 58 has internal serrations 58a including irregular thicknesses to form three axial grooves as well as internal spline teeth in the coupling sleeve to be worked from the blank 58 as previously discussed in connection with the blank 1 shown in FIGS. 2 to 4. Furthermore, the blank 58 is such that each of the internal serrations 58a thereof has counter-wedged opposite end portions. Accordingly, each of the external serrations of the coining tools 45 has opposite end portions which are reduced toward the outer axial ends of the tools 45 so that the axial groove formed between every adjacent two of the serrations is enlarged in counter-wedged form toward the outer axial ends of the tools 45. The external serrations of the land portions 45a and 45b of each coining tool 45 and the external serrations of each finishing tool 46 are identical in number to the internal serrations 58a of the blank 58 which is thus to be ultimately worked into the form of such a synchronizer clutch sleeve. The internal serrations of the previously mentioned internally serrated member 50 are also identical in number to the internal serrations 58a of the blank 58. As will be best seen from FIG. 9, the blank 58 is further formed with a circumferential external groove 58b to be engaged by an arcuate fork portion of a shifter fork (not shown).

The above mentioned guide gear 57 forming part of the apparatus embodying the present invention has internal teeth 57a which are equal in number to the internal serrations 58a of the blank 58. The teeth 57a of the guide gear 57 are, furthermore, cut with outwardly shifted tooth profiles providing enlarged addenda and, for this reason, have thicknesses larger than those of the internal serrations 58a of the blank 58. By reason of such arrangements of the internal teeth 57a of the guide gear 57, the external serrations of the tools 45 and 46 are enabled to properly and correctly mate with the internal serrations 58a of the blank 58 when the coining and finishing tools 45 and 46 are moved into positions closest to the center axis of the gear shaft 35.

For the secondary working of the blank 58 in the secondary working apparatus embodying the present invention, the blank 58 is first fitted to the coining and finishing tools 45 and 46 and is thereafter fixedly held in position with respect to the housing structure with use of a suitable clamping or gripping device such as, for example, a chuck (not shown). The driving source for the belt and pulley mechanism including the grooved pulley 30 (FIG. 5) is then put into operation driving the pulley 30 for rotation about the aligned axes of rotation of the first driven gear 24 and second driven gear 25. The driving power thus transmitted to the pulley 30 and accordingly to the drive gear 28 integral therewith is imparted to the first driven gear 24 and the second driven gear 25 through the engagement between the drive gear 28 and the first driven gear 24 and the engagement between the drive gear 28 and the second driven gear 25. As a consequence, the first driven gear 24 and second driven gear 25 are driven for rotation about the aligned center axes thereof with respect to the housing shell 10 at speeds with a predetermined difference as previously noted. Such differential motions of the first driven gear 24 and second driven gear 25 are transmitted through the hollow shaft 17 and the center shaft 18 and further by way of the gear casing 31 and gear shaft 35 to the ring gear 38 and the sun gear 39, respectively, of the planetary gear assembly 37 and thereby produce a differential speed of rotation between the ring gear 38 and the sun gear 39 about the common center axis thereof. Since, in this instance, the first driven gear 24 and accordingly the ring gear 38 are driven for rotation at speeds higher than the speeds of rotation of the second driven gear 25 and accordingly of the sun gear 39, there is produced between the ring gear 38 and the sun gear 39 of the planetary gear assembly 37 a relative rotary motion which is such that the ring gear 38 appears to be rotating with respect to the sun gear 39 in the direction of rotation of the ring gear 38. It therefore follows that the pinion carrier 43 fastened to the ring gear 38 and accordingly the pinion shafts 42 and 42' carried by the pinion carrier 43 are caused to turn about the common axis of rotation of the ring gear 38 and the sun gear 39 with respect to the sun gear 39. As the pinion carrier 43 and the pinion shafts 42 and 42' thus turn about the common center axis of the ring gear 38 and the sun gear 39 of the planetary gear assembly 37, the respective planet pinions 40 on the individual pinion shafts 42 and 42' are caused to turn coaxially with the pinion carrier 43 and the pinion shafts 42 and 42' and are caused to roll on the sun gear 39 with respect to which the pinion carrier 43 and the pinion shafts 42 and 42' are rotating. The result is that each of the planet pinions 40 and accordingly the pinion shaft 42 or 42' is caused to turn not only with respect to the sun gear 39 about the common axis of rotation of the ring gear 38 and the sun gear 39 but further with respect to the pinion carrier 43 about the center axis of the planet pinion 40 per se. The rotation of each of the pinion shafts 42 and 42' about the center axis thereof with respect to the pinion carrier 43 results in revolution of the center axis of the eccentric axial portion 44 of each of the shafts 42 and 42' about the center axis of each of the shafts 42 and 42'. The coining and finishing tools 45 and 46 respectively carried on the eccentric axial portions 44 of the pinion shafts 42 and 42' are accordingly caused to turn about the respective center axes of the shafts 42 and 42' while turning about the common axis of rotation of the pinion shafts 42 and 42'. The individual coining and finishing tools 45 and 46 are thus caused to roll on the blank 58 which is fixedly held in position with respect to the housing structure. As a result of the rolling motion of the coining tools 45 on the blank 58, the individual external serrations of the land portions 45a and 45b of each of the coining tools 45 are forced deeper in succession into the spaces between the internal serrations 58a of the blank 58 outwardly in radial directions of the blank 58 due to the eccentricity of the coining tool 45 with respect to the pinion shaft 42 or 42'. As the external serrations of each coining tool 45 are thus forced deeper into the spaces between the counter-wedged portions of the individual internal serrations 58a of the blank 58, each of the serrations 58a of the blank 58 is forcefully pressed upon between neighboring two of the external serrations of the coining tool 45 and is, as a consequence, shaped and sized, or coined, conformingly to the space between the two serrations of the coining tool 45. As the coining tools 45 are thus turning on the blank 58, the individual external serrations of each of the finishing tools 46 are also forced deeper in succession into the spaces between the internal serrations 58a of the blank 58 outwardly in radial directions of the blank 58. Each of the external serrations of the finishing tool 46 is in this manner caused to slide on the opposite faces of neighboring two of the internal serrations 58a of the blank 58, which is as a consequence finished and cleared of the flashes produced on the side faces of of the serrations 58a when the blank 58 is worked by the coining tools 45.

As the eccentric axial portions 44 of the pinion shafts 42 and 42' and accordingly the coining and finishing tools 45 and 46 thereon turn commonly about the center axis of the blank 58 and individually about the respective center axes of the pinion shafts 42 and 42', the center axis of each of the eccentric axial portions 44 is caused to turn about the axis of rotation of the shaft 42 or 42' as a whole so that the center axis of each eccentric axial portion 44, viz., the center axis of each of the coining and finishing tools 45 and 46 is displaced radially outwardly of the blank 58 from the location closest to the center axis of the gear shaft 35 toward the location closest to the serrated inner perimeter of the blank 58. The distance of displacement between these two locations is dictated by the amount of eccentricity between the axis of rotation of each of the pinion shafts 42 and 42' and the center axis of the eccentric axial portion 44 of each pinion shaft 42 or 42'.

As the center axis of each of the coining and finishing tools 45 and 46 is displaced radially outwardly of the blank 58 as above discussed, the coining and finishing tools 45 and 46 which are held in mesh with the previously described guide gear 57 force the guide gear 57 radially outwardly and are restrained from being unduly displaced with respect to the internal serrations 58a of the blank 58 in a circumferential direction of the blank 58. It therefore follows that each of the coining and finishing tools 45 and 46 is permitted to maintain a correct predetermined position with respect to the blank 58 and to have its external serrations correctly held in mesh with the internal serrations 58a of the blank 58. As the coining and finishing tools 45 and 46 are moved toward the serrated inner perimeter of the blank 58, the guide gear 57 constructed of highly elastic metal is caused to elastically deform into a generally rhombic form by the two pairs of tools 45 and 46 and is thus permitted to maintain its proper engagement with the internal serrations 58a of the blank 58.

The amount of displacement of the common center axis of the eccentric axial portion 44 of each pinion shaft 42 is dependent upon the angle through which the sun gear 39 of the planetary gear assembly 37 is caused to turn with respect to the ring gear 38, viz., the angle of rotation of the hollow shaft 17 with respect to the center shaft 18. The amount of displacement of the center axis of each of the coining and finishing tools 45 and 46 with respect to the blank 58 can therefore be detected through detection of the angular position of the hollow shaft 17 with respect to the center shaft 18. Since, in this instance, the hollow shaft 17 and the center shaft 18 are driven at speeds with a predetermined difference established therebetween, the angular position of the hollow shaft 17 with respect to the center shaft 18 can be detected through detection of the angle through which the hollow shaft 17 is driven for rotation about the center axis thereof with respect to the housing structure. The pick-up unit 55 of the previously mentioned rotation-angle detecting means is thus adapted to detect such an angle by counting the number of those teeth of the spur gear 53 which have passed through the predetermined zone adjacent the pick-up unit 55. When the hollow shaft 17 is turned through a predetermined angle from the initial angular position thereof with respect to the housing structure and accordingly a predetermined number of teeth of the gear 53 is counted by the pick-up unit 55, a control signal is fed from the pick-up unit 55 to the control means of the driving source for the belt and pulley mechanism so as to actuate the driving source to drive the pulley 30 for rotation in a reverse direction until the hollow shaft 17 restores the initial angular position thereof with respect to the housing structure.

What is claimed is:

1. A secondary working apparatus for secondarily machining a blank preliminarily formed with internal serrations on a cylindrical plane having a center axis therethrough, comprising a stationary housing structure;

support means for supporting the blank with the center axis of said cylindrical plane fixed with respect to the housing structure;

a plurality of shafts each having a center axis substantially parallel with the center axis of said cylindrical plane and rotatable with respect to said housing structure about an axis substantially coincident with the center axis of said cylindrical plane and an axis substantially coincident with the center axis of the shaft, each of the shafts having a cylindrical eccentric axial portion having a center axis substantially parallel with and radially offset from the center axis of the shaft;

generally cylindrical machining tools coaxially carried on the eccentric axial portions of said shafts, respectively, and each having a center axis substantially coincident with the center axis of the eccentric axial portion of each of said shafts; and an annular guide gear coaxially held in position about said center axis of said cylindrical plane and formed with internal teeth to be held in mesh with said machining tools, said internal teeth being equal in number to the internal serrations of the blank and being cut with outwardly shifted tooth profiles.

2. A secondary working apparatus as set forth in claim 1, in which said guide gear is constructed of highly elastic metal.

3. A secondary working apparatus as set forth in claim 1 or 2, in which said machining tools include at least one finishing tool formed with external serrations to be held in mesh with the internal serrations of said blank.

4. A secondary working apparatus as set forth in claim 1 or 2, in which said machining tools include at least one coining tool and at least one finishing tool each formed with external serrations to be held in mesh with the internal serrations of said blank.

5. A secondary working apparatus as set forth in claim 1 or 2, in which the shafts having said finishing tools carried thereon are arranged to have their respective center axes diametrically opposite to each other across the center axis of said cylindrical plane.

6. A secondary working apparatus as set forth in claim 5, in which said shafts are arranged to have their respective center axes substantially in symmetry with respect to the center axis of said cylindrical plane.

7. A secondary working apparatus as set forth in claim 6, further comprising a planetary gear assembly which comprises an internally toothed ring gear rotatable with respect to said housing structure about an axis substantially aligned with the center axis of said cylindrical plane, an externally toothed sun gear coaxially encircled by the ring gear, a plurality of planet pinions each held in mesh with the ring gear and the sun gear and rotatable with each of said shafts about the center axis of the shaft, and a pinion carrier having said planet pinions and said shafts respectively carried thereon, one of said sun gear and said pinion carrier being rotatable about the axis of rotation of said ring gear.

8. A secondary working apparatus as set forth in claim 7, in which said support means is operative to have said blank fixedly held in position with respect to said housing structure, wherein said sun gear is rotatable with respect to said housing structure about the axis of rotation of said ring gear and said pinion carrier is rotatable with said ring gear about the axis of rotation of the ring gear so that each of said shafts and accordingly the machining tools carried on the shafts are rotatable with respect to said pinion carrier about the center axis of the shaft and with respect to said housing structure about the common axis of rotation of said ring gear and said sun gear.

9. A secondary working apparatus as set forth in claim 8, further comprising differential-speed drive means operative to drive the ring gear and the sun gear of said planetary gear assembly for rotation with respect to said housing structure about the common axis of rotation thereof at speeds with a predetermined difference established therebetween.

10. A secondary working apparatus as set forth in claim 9, in which said differential-speed drive means comprises an externally toothed first driven gear rotatable about an axis substantially aligned with the common axis of rotation of the ring gear and the sun gear of said planetary gear assembly, an externally toothed second driven gear axially spaced apart from the first driven gear and rotatable about an axis substantially aligned with the axis of rotation of the first driven gear, and an internally toothed drive gear coaxially encircling and held in mesh with both of the first driven gear and the second driven gear, the external teeth of each of the first and second driven gears being equal in diametral pitch to the internal teeth of said drive gear and being different in number from the external teeth of the other of the first and second driven gears.

11. A secondary working apparatus as set forth in claim 10, further comprising externally serrated annular locating pinions coaxially mounted on said shafts, respectively, and each rotatable on each of the shaft about the center axis of the shaft and together with each of said machining tools with respect to said housing structure, and an internally toothed stationary member/formed with internal serrations equal in number to the internal serrations of the blank and held in mating engagement with the external serrations of said locating pinions.

12. A secondary working apparatus as set forth in claim 11, in which said internally toothed stationary member is formed with a concavity having said guide gear accommodated therein. I

* * * * *